United States Patent [19]

Sterzer

[11] Patent Number: 5,149,198

[45] Date of Patent: Sep. 22, 1992

[54] TEMPERATURE-MEASURING MICROWAVE RADIOMETER APPARATUS

[75] Inventor: Fred Sterzer, Princeton, N.J.

[73] Assignee: MMTC, Inc., Princeton, N.J.

[21] Appl. No.: 699,309

[22] Filed: May 2, 1991

[51] Int. Cl.⁵ .............................. G01K 1/17; G01J 5/00
[52] U.S. Cl. ................................... 374/139; 374/122; 374/208
[58] Field of Search ............... 374/122, 128, 129, 139, 374/140, 158, 208, 209; 250/250

[56] References Cited

U.S. PATENT DOCUMENTS

| | | | |
|---|---|---|---|
| 3,325,644 | 6/1967 | Frye et al. | 374/122 X |
| 3,446,074 | 5/1969 | Thomas | 374/122 |
| 3,465,339 | 9/1969 | Marner | 374/122 |
| 3,564,420 | 2/1971 | Haroules et al. | 374/122 |
| 3,638,494 | 2/1971 | Broussaud et al. | 374/122 |
| 3,791,209 | 2/1974 | Norburn | 374/140 |
| 4,004,219 | 1/1977 | Tiuri et al. | 374/122 X |
| 4,647,222 | 3/1987 | Schultheiss | 374/139 |
| 4,677,988 | 7/1987 | Constant | 374/122 X |

FOREIGN PATENT DOCUMENTS

799726  1/1981  U.S.S.R. .............. 374/122

OTHER PUBLICATIONS

"Microwave Radiometers for Non-invasive Measurements of Subsurface Tissue Temperatures," F. Sterzer, *Automedica*, 1987, vol. 8, pp. 203-211.
"Industrial Microwave Sensors," pp. 274-275, E. Nyfors et al., Artech House, Inc., 1989.

*Primary Examiner*—William A. Cuchlinski, Jr.
*Assistant Examiner*—G. Bradley Bennett
*Attorney, Agent, or Firm*—George Seligsohn

[57] ABSTRACT

Disclosed are the following three improvements to apparatus employing a microwave radiometer to measure the temperature of a specimen: By situating a low-loss, high-temperature dielectric microwave antenna, which may be composed of low-loss alumina ceramic, within a high-loss-high-temperature antenna sheath, which may be a ceramic composed of an alumina-graphite mixture, a microwave radiometer may be employed to continuously measure the temperature of a material at high temperature, such as molten steel. A Dicke switch replacement for a microwave radiometer comprises a first hybrid ring in which (1) a first combination of first and second input signals thereto derived at a first output port thereof is amplified and forwarded through a switchable phase shifter to a first input port of a second hybrid ring, and (2) a second combination of the first and second input signals thereto derived at a second output port thereof is amplified and forwarded directly to a second input port of the second hybrid ring, resulting in one of the amplified first and second input signals being derived at a first output port of the second hybrid ring and the other of the amplified first and second input signals being derived at a second output port of the second hybrid ring. Switching the switchable phase shifter back-and-forth between 0° and 180° phase shift cyclically reverses the respective output ports of the second hybrid ring at which each of the amplified first and second input signals is derived. A resistance, terminating a coaxial transmission line that couples it to the input of a microwave radiometer, is heated by a heater surrounding it that is energized by an amount of current controlled by the radiometer output. The control is such that the temperature of the resistance reaches a steady state at which it matches the temperature of the specimen. A thermocouple probe in thermal contact with the resistance permits the temperature of the resistance to be indicated by a thermocouple meter.

14 Claims, 6 Drawing Sheets

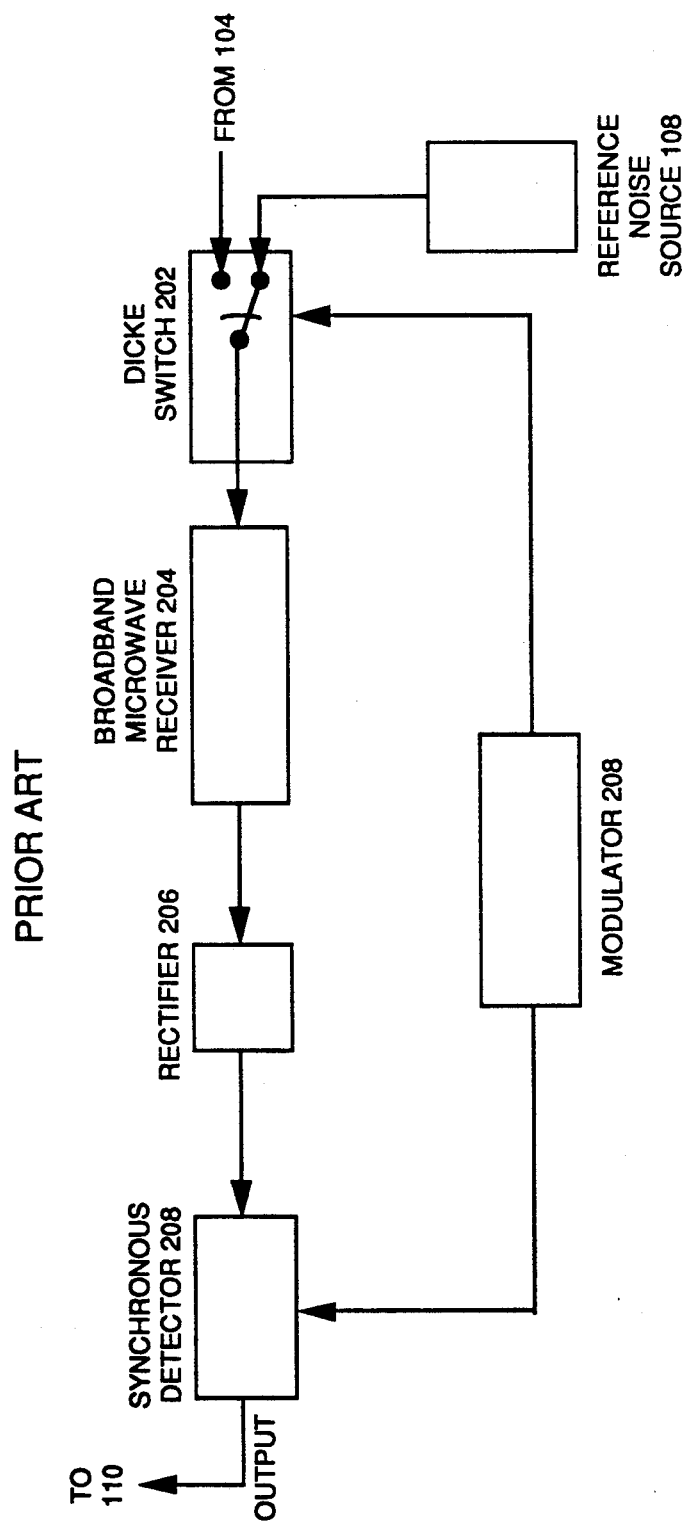

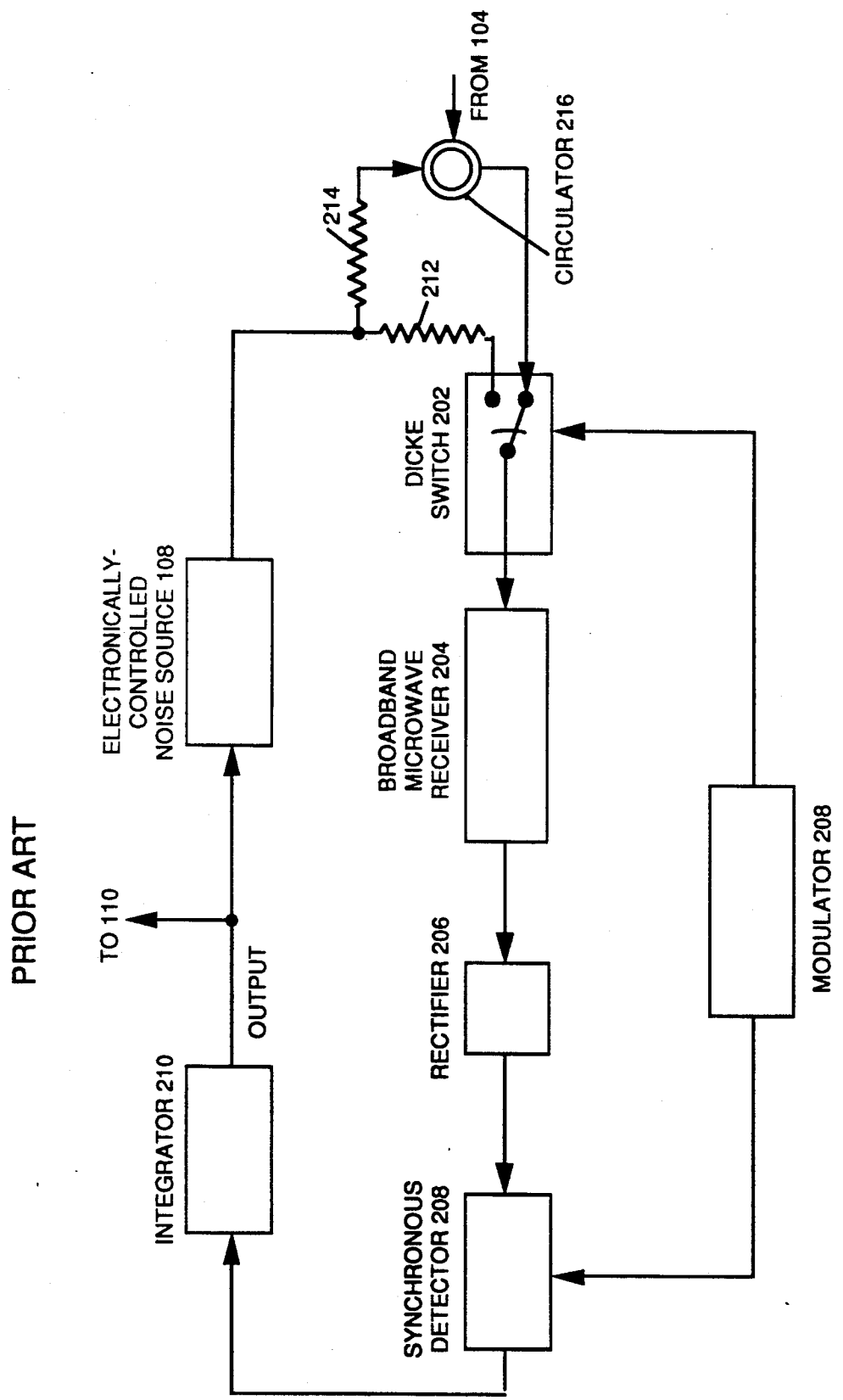

TEMPERATURE-MEASURING MICROWAVE RADIOMETER APPARATUS

BACKGROUND OF THE INVENTION

1. Field of the Invention

This invention relates to apparatus employing a microwave radiometer to measure the temperature of a specimen and, more particularly, to improvements in such apparatus.

2. Description of the Prior Art

Apparatus employing a microwave radiometer to measure the temperature of a specimen is known in the art and, by way of example, is used medically to measure the subsurface tissue temperature of a patient. In this regard, reference is made to the article "Microwave Radiometers for Non-invasive Measurements of Subsurface Tissue Temperatures", written by me, which appears in the publication *Automedica*, 1987, Vol. 8, pages 203-211.

It would be desirable to extend the use of microwave-radiometry temperature-measuring apparatus to other areas which currently are not using such apparatus. One such area is the measurement of a very high temperature of a material, such as molten steel, which is usually measured by any one of several known pyrometric techniques. Further, by decreasing the cost and/or increasing the efficiency of microwave-radiometry temperature-measuring apparatus, it would become practical to use such apparatus in many other temperature-measuring areas. Disclosed herein are improvements which make possible such extension in the use of microwave-radiometry temperature-measuring apparatus to other areas.

SUMMARY OF THE INVENTION

A first improvement in apparatus employing a microwave radiometer to measure the temperature of a specimen is directed to the structural implementation of a high-temperature microwave antenna means (which comprises a microwave antenna within the interior of an antenna sheath that operates as a "black body" for absorbing and thn reradiating heat to the microwave antenna) that makes it possible to continuously measure the temperature of a material at high temperature, such as molten steel.

A second improvement in apparatus employing a microwave radiometer to measure the temperature of a specimen is directed to a Dicke switch replacement which employs two hybrid circuits, preferably in the form of hybrid rings, to permit amplification of both unknown and reference signals in a manner which, besides increasing the signal-to-noise ratio of the radiometer, is immune to differences in amplifier characteristics for each of the two signals and permits the sensitivity of the radiometer to be doubled.

A third improvement in apparatus employing a microwave radiometer to measure the temperature of a specimen is directed to a microwave reference noise source comprised of a resistance which is controllably heated in accordance with the microwave radiometer output to a steady-state temperature which corresponds to the temperature of the specimen. This permits the steady-state temperature to be measured by an inexpensive thermocouple temperature meter.

BRIEF DESCRIPTION OF THE DRAWINGS

FIGS. 2a and 2b illustrate different prior-art species of microwave radiometers used to measure the temperature of a specimen;

DESCRIPTION OF THE PREFERRED EMBODIMENTS

Figure 1:
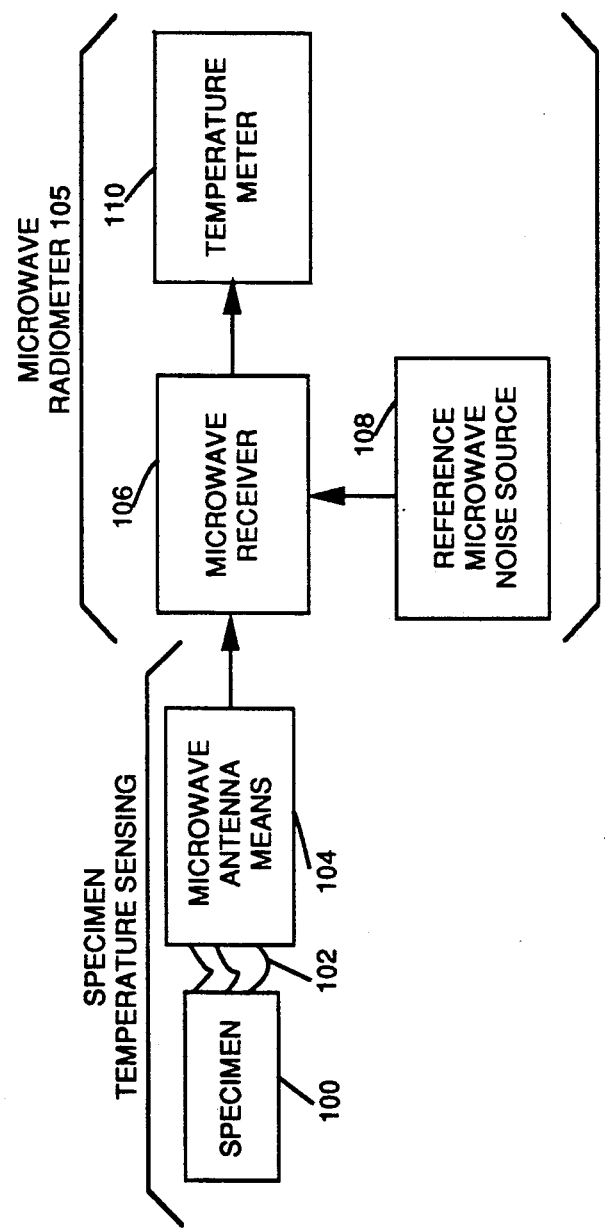
FIG. 1 is a functional diagram of apparatus which employs a microwave radiometer to measure the temperature of a specimen.

As functionally shown diagrammatically in FIG. 1, specimen 100 emits electromagnetic radiation 102 that has an intensity and a frequency-spectrum distribution each of which is a function of the temperature of specimen 100 and the characteristics of the material of which specimen 100 is composed. This frequency-spectrum distribution includes a microwave interval including a portion to which microwave antenna means 104 is responsive. The temperature of specimen 100 is sensed by microwave antenna means 104, which is positioned in cooperative spatial relationship with specimen 100 to receive that portion of electromagnetic radiation 102 which is within this microwave interval. Microwave radiometer 105, comprising microwave receiver 106, microwave noise source 108 and temperature meter 110, (examples of which are shown in FIGS. 2a and 2b, discussed below) compares the relative intensity of the microwave noise output from microwave antenna means 104 (applied as a first input to microwave receiver 106) with respect to the intensity of the output from reference microwave noise source 108 (applied as a second input to microwave receiver 106). The temperature of specimen 100 is indicated by temperature meter 110 (i.e., an analog or digital meter indexed in temperature degrees) in response to the output from microwave receiver 106 applied as an input thereto.

FIG. 2a illustrates a relatively simple prior-art implementation of microwave radiometer 105. The output from a calibrated reference noise source 108 (which may comprise a noise diode) is applied to a first input of so-called Dicke switch 200 and the output from antenna means 104 is applied to a second input thereof. The output of Dicke switch 200 is applied to the input of broadband microwave receiver 202 and the output of receiver 202, after rectification by rectifier 204, is applied as an input to synchronous detector 206. The output of Dicke switch 200, under the control of modulator 208, is cyclically oscillated back and forth between its first and second inputs at a given rate. At the same time, synchronous detector 206 is cyclically operated under the control of modulator 208 at the same given rate. The result is the output amplitude from synchronous detector 206 during each cycle varies from a first level indicative of the intensity of the microwave noise received by antenna 104 (corresponding to specimen temperature) and the intensity of the microwave noise generated by reference noise source 108. The specimen temperature is indicated by properly calibrated temperature meter 110 responsive to the difference between the first and second levels.

Besides the "signal" microwave noise generated by specimen 100 and received by microwave antenna means 104, each of the components making up a radiometer itself generates unwanted microwave noise with an intensity which is a direct function of its absolute temperature (which is about 290 K. for a radiometer operating at room temperature). Because each component's contribution to the total unwanted microwave noise at the output of broadband microwave receiver 202 is inversely proportional to its amplification in receiver 202, it is only the unwanted microwave noise generated by front-end components, such as Dicke switch 200, which contribute significantly to the total unwanted noise at the output of broadband microwave receiver 202. The system noise $T_S$ can be considered the sum of the "signal" microwave noise $T_A$ and the unwanted component-generated microwave noise $T_N$ at the output of broadband microwave receiver 202. $\Delta T_A$, the smallest detectable change in $T_A$ (defined by the rms variation of the output of broadband microwave receiver 202), is given by the following equation:

$$\Delta T_A = K T_S / \Delta f \tau,$$

where $\tau$ is the integration time, $\Delta f$ is the IF bandwidth of broadband microwave receiver 202, and K is a constant which depends on the type of radiometer. Since a Dicke radiometer measures the "signal" microwave noise $T_A$ only half the time, $K = 2$. The rms noise $\Delta T_A$ is a measure of the sensitivity of the radiometer. Usually, $\Delta T_A$ is reported given the assumption that $\tau = 1$ second. It is desirable that a radiometer have a relatively high sensitivity (particularly in those cases in which the difference between the temperatures of the specimen and room temperature is relatively small).

In this regard, the relative intensity of the portion of the microwave interval of electromagnetic radiation 102 that is received by microwave antenna means 104 and forwarded as an input to the Dicke switch of microwave radiometer 105 is lowered by an amount that is a function of the degree of uncompensated impedance mismatch that exists between specimen 100 and microwave antenna means 104. The relatively simple prior-art implementation of microwave radiometer 105 shown in FIG. 2a provides no means for compensating for any mismatch. However, the more complex prior-art self-balancing implementation of microwave radiometer 105 shown in FIG. 2b does provide means for compensating for moderate mismatch.

In particular, as shown in FIG. 2b, the output from synchronous detector 206, after being integrated by integrator 210, constitutes the output to temperature meter 110. Further, the output to temperature meter 110 from integrator 210 is fed back as a control input to an electronically-controlled reference noise source 108 (i.e., the intensity of noise generated by electronically-controlled noise source 108 varies directly with the level of the output to temperature meter 110). The output from electronically-controlled noise source 108 is applied through power-splitting resistance 212 to a first input of Dicke switch 200 and is applied through power-splitting resistance 214 to a first port of circulator 216. Microwave antenna means 104 is coupled to a second port of circulator 216 and microwave radiation arriving at a third port of circulator 216 is applied to a second input of Dicke switch 200. As indicated by the circulator 216 arrow in FIG. 2b, microwave radiation travels clockwise from the first port to the second port of circulator 216, and from the second port to the third port of circulator 216. Unless the impedance match, as seen from the second port of circulator 216, happens to be perfect, some of the noise microwave radiation arriving at the second port of circulator 216 will travel back through microwave antenna means 104 to specimen 100, thereby substantially compensating for the impedance mismatch. Further, the feedback of the integrated output to temperature meter 110 as a control input to electronically-controlled noise source 108 results in the intensity of the noise microwave radiation applied to the first input of Dicke switch 200 being automatically adjusted to the point that it is substantially equal to and balances the intensity of the microwave radiation applied from the third port of circulator 216 to the second input of Dicke switch 200.

A first improvement in apparatus employing a microwave radiometer to measure the temperature of a specimen, with which the present invention is concerned, is in the processing of a material at high temperature, such as molten steel. More particularly, in the processing of a material at high temperature, such as molten steel, within a container, such as a tundish, it is usually necessary to know the temperature of the material at high temperature therein. In the case of molten steel within a tundish, a thermocouple is often employed to make temperature measurements. Because of the very high temperature and corrosive nature of molten steel, the thermocouple that is used comprises noble and expensive metals, such as platinum. Even so, such a thermocouple cannot be left continuously in the molten steel without destruction of the thermocouple taking place in a relatively short time. Thus, temperature measurements of the molten steel are made only intermittently with the thermocouple. Temperature measurement of the molten steel by means of a microwave radiometer could be made continuously if a species of microwave antenna means 104 could be found that could remain immersed in the corrosive high-temperature molten steel for a relatively long period of time without destruction thereof taking place. The novel species of microwave antenna means 104 shown in FIGS. 3 and 3a makes possible such continuous temperature measurement of molten steel by means of a microwave radiometer.

Figure 3:
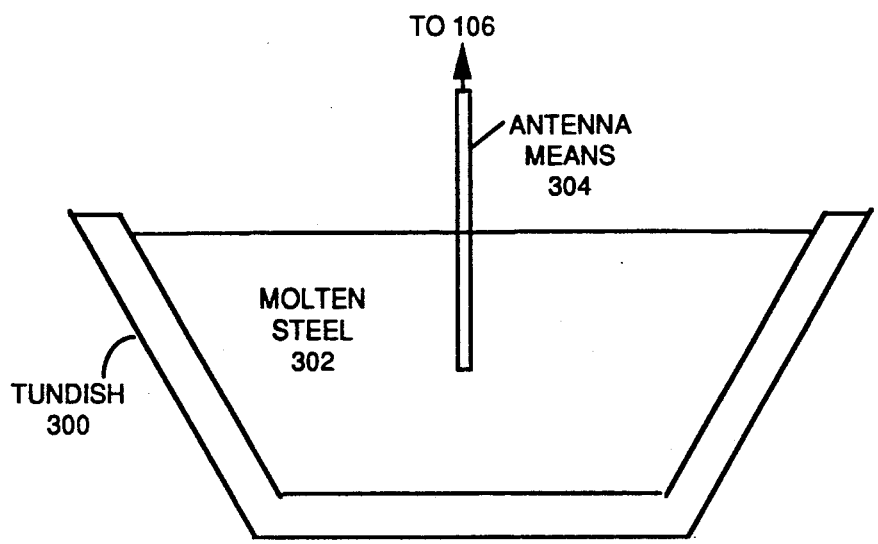
FIGS. 3 and 3a illustrate a species of microwave antenna means, constituting a first improvement in apparatus employing a microwave radiometer, that makes it possible to employ a microwave radiometer to continuously measure the high temperature of molten steel.

Referring to FIG. 3, there is shown tundish 300 filled with molten steel 302 into which antenna means 304 is partially immersed. Antenna means 304 (shown in detail in FIG. 3a discussed below), which constitutes an improved species of microwave antenna means 104, is coupled to the input of radiometer 105.

Figure 3A:
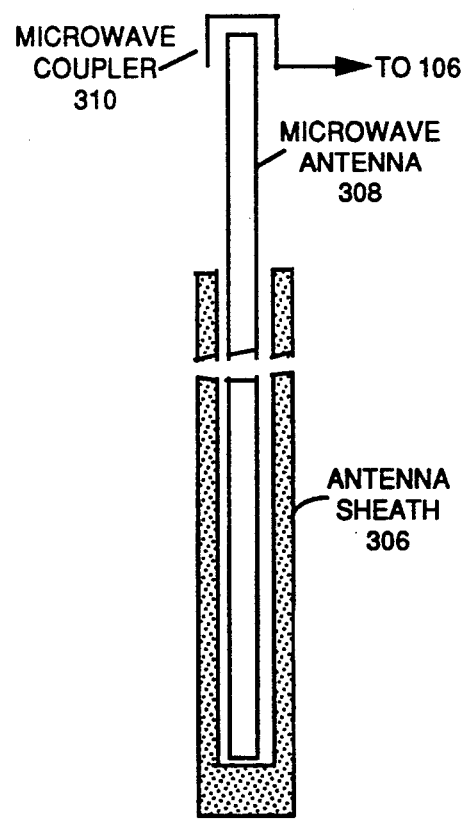

As shown in FIG. 3a, antenna means 304 comprises antenna sheath 306, microwave antenna 308 and microwave coupler 310. Antenna sheath 306, which comprises a protective tube about microwave antenna 308, is intended to have at least its bottom portion (and preferably most of its length) immersed in molten steel 302. However, the top portion of antenna sheath 306 is intended to protrude from the surface of molten steel 302. Of particular importance from the point of view of the present invention is that antenna sheath 306 comprises a high-loss, high-temperature ceramic material that (1) can withstand being immersed in molten steel continuously for a long period of time without substantial damage thereto, and (2) exhibits characteristics approaching that of a "black body" for absorbing heat radiation from the surrounding molten steel 302 and then reradiating a portion of the absorbed heat radiation as microwave energy into the interior of antenna sheath 306, where it may be received by microwave antenna 308. In this manner, the amount of absorbed heat radiation, and consequently the intensity of the microwave energy received by microwave antenna 308, is a function of the temperature of molten steel 302 (which then may be forwarded through microwave coupler 310 to radiometer 105 for measurement of the temperature of molten steel 302).

An example of a high loss, high temperature ceramic material which comprises antenna sheath 306 may be composed of an alumina-graphite mixture, such as that employed by the Serro Corporation in manufacturing a prototype of antenna sheath 306. Such alumina-graphite mixture is substantially inert to the high temperature and corrosive nature of molten steel. Microwave antenna 308 is a dielectric microwave rod antenna composed of low-loss alumina ceramic, which also is substantially inert to the high temperature reradiated into the interior of antenna sheath 306 and received by microwave antenna 308.

In the illustrative embodiment shown in FIG. 3, a material at high temperature (i.e., molten steel) is contained in a tundish. It should be understood that other type of containers for a material at high temperature may be employed. For instance, a steel converter, rather than a tundish, may contain the molten steel that is having its temperature continuously measured by means of a radiometer. Further, the high temperature material could be a solid, rather than a fluid as shown in FIG. 3. For instance, the thick refractory wall of a converter or other vessel which is heated to a high temperature may be provided with a bore hole therein into which antenna means 304 is immersed with the outer surface of antenna sheath 306 being situated in intimate heat-conductive contact with the surrounding refractory wall.

Figure 4:
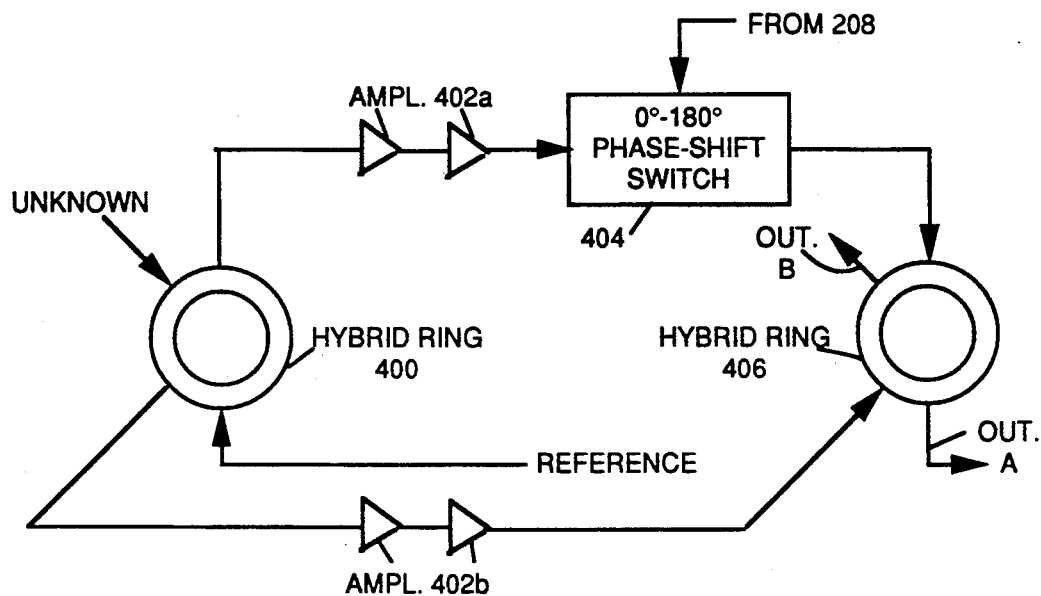
FIGS. 4 and 4a illustrate a replacement for a Dicke switch, constituting a second improvement in apparatus employing a microwave radiometer, that makes it possible to provide a microwave radiometer that has double the sensitivity and a higher signal-to-noise ratio than the prior-art species of microwave radiometers shown in FIGS. 2a and 2b.

A second improvement in apparatus employing a microwave radiometer to measure the temperature of a speciment with which the present invention is concerned involves a Dicke switch replacement 200-X, shown in FIG. 4, that makes it possible to increase the sensitivity and signal-to-noise ratio of a microwave radiometer. More particularly, as discussed above, the rms noise $\Delta T_A$ (defined by the equation $\Delta T_A = K T_S / \sqrt{\Delta f \tau}$) is a measure of the sensitivity of a radiometer, and since a Dicke radiometer of the prior art type shown in either FIG. 2a or FIG. 2b measures the "signal" microwave noise $T_A$ only half the time, $K=2$. The second improvement provided by the present invention, shown in FIGS. 4 and 4a, makes it possible to make $K=1$, so that the "signal" microwave noise $T_A$ is measured all of the time, thereby doubling radiometer sensitivity.

Further, unless the conventional Dicke switch employed at the front end of the prior-art radiometer shown in either FIG. 2a or FIG. 2b is implemented with relatively expensive low-loss ferrite material, the conventional Dicke switch at room temperature introduces a considerable amount to the unwanted component-generated microwave noise $T_N$, thereby lowering the signal-to-noise ratio of the radiometer.

Referring to FIG. 4, the Dicke switch replacement 200-X comprises hybrid ring 400, amplifiers 402a and 402b, 0°-180° phase-shift switch 404, and hybrid ring 406. Each of hybrid rings 400 and 406 may be physically constructed in microstrip form. The "unknown", (whether derived directly from microwave antenna means 104, as in FIG. 2a, or from the output port of circulator 216, as in FIG. 2b) is applied to a first input port of hybrid ring 400 and the reference from noise source 108 is applied to a second input port of hybrid ring 400. The output from a first output port of hybrid ring 400, after being forwarded through through a first path comprising amplifiers 402a and 0°-180° phase-shift switch 404, is applied as an input to a first input port of hybrid ring 406. The output from a second output port of hybrid ring 400, after being forwarded through a second path comprising amplifiers 402b, is applied as an input to a second input port of hybrid ring 406. Hybrid ring 406 derives output A at a first output port thereof and derives output B at a second output port thereof.

As indicated in FIG. 4, phase-shift switch 404 has a control input applied thereto from modulator 208. In response thereto, the output of phase-shift switch 404 is switched back-and-forth between its 0° state and its 180° state (i.e., the respective phase delays introduced by the first and second paths are such that the relative phase difference between the signals respectively forwarded to the first and second input ports of hybrid ring 406 is substantially 0° when phase-shift switch 404 is in its 0° state and is substantially 180° when phase-shift switch 404 is in its 180° state). As known in the art, each of hybrid rings 400 and 406 operates as a magic T. The result is that (1) the amplified unknown is forwarded to output A and the reference is forwarded to output B of hybrid ring 406 when the output from phase-shift switch 404 is in its 180° state, and (2) the amplified unknown is forwarded to output B and the reference is forwarded to output A of hybrid ring 406 when the output from phase-shift switch 404 is in its 0° state. While it is convenient to implement a hybrid circuit at microwave frequencies in the form of a hybrid ring, it should be understood that other forms of hybrid circuit could be substituted for hybrid ring 400 and/or 406.

Dicke switch replacement 200-X has many advantages over a conventional Dicke switch. First, amplification by amplifiers 402a and 402b occurs before switching. This amplification effectively reduces the loss that would occur in a conventional Dicke switch, thereby increasing the signal-to-noise ratio of the radiometer. Second, amplifiers 200a at all times amplify a first part of the microwave energy of the unknown and a first part of the microwave energy of the reference, while amplifiers 200b at all times amplify the remaining part of the microwave energy of the unknown and the remaining part of the microwave energy of the reference. Therefore, any differences in the amplification characteristics between amplifiers 200a and amplifiers 200b will not affect the respective levels of microwave energy at output A and output B of hybrid ring 406 (as it would in the case in which the unknown were amplified entirely by one set of amplifiers and the reference were amplified entirely by another set of amplifiers).

Figure 4A:
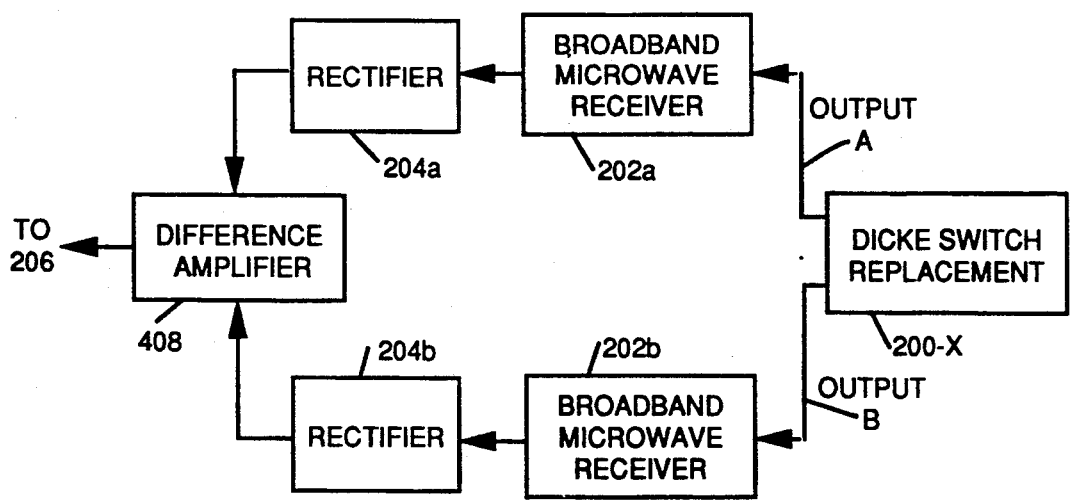

Third, at no time is any of either the unknown signal or reference lost. Therefore, although either output A or output B, alternatively, of hybrid ring 406 may be applied as an input to the broadband microwave receiver 202 of the FIGS. 2a or 2b to derive the prior-art radiometer sensitivity, in which K=2, it is preferable that both output A and output B of hybrid ring 406 be utilized, so that a double radiometer sensitivity, in which K=1, may be obtained. FIG. 4a shows a modification of the radiometer structure of FIG. 2a or of the radiometer structure of FIG. 2b which makes it possible to achieve this double radiometer sensitivity.

Referring to FIG. 4a, output A from Dicke switch replacement 200-X is applied as an input to broadband microwave receiver 202a and output B from Dicke switch replacement 200-X is applied as an input to broadband microwave receiver 202b. The output from broadband microwave receiver 202a is applied as an input to rectifier 204a and the output from broadband microwave receiver 202b is applied as an input to rectifier 204b. The output from rectifier 204a is applied as a first input to difference amplifier 408 and the output from rectifier 204b is applied as a second input to difference amplifier 408. The respective outputs from rectifiers 204a and 204b, other than being inverted with respect to one another, are similar-amplitude signals that alternate in polarity in accordance with the control signal applied to phase-shift switch 404 from modulator 208. Therefore, the amplitude of the output from difference amplifier 408, which is applied as an input to synchronous detector 206, is proportional to substantially double the amplitude of either the first or second inputs to difference amplifier 408.

It is apparent that there are other structural implementations within the skill of the art from that specifically shown in FIG. 4a by which a radiometer signal may be derived that is substantially proportional to the combined respective amplitudes of outputs A and B from Dicke switch replacement 200-X.

In the prior art species shown in FIG. 2a, reference noise source 108 conventionally comprises a noise diode, and the output to temperature meter 110 from synchronous detector 206 comprises an electrical signal that varies in level during each cycle of modulator 208 between a first value corresponding to the intensity of the microwave signal from microwave antenna means 104 (indicative of the temperature of specimen 100) and a second value corresponding to the intensity of the microwave noise signal from reference noise source 108 (indicative of a known reference temperature). Thus, temperature meter 110, shown in FIG. 1, while indexed in degrees of temperature, does not respond directly to temperature. Instead, meter 110 is an electric meter (e.g., volt or current meter) that must be calibrated with respect to that particular second level value of the electrical signal from synchronous detector 206 that corresponds to the known reference temperature represented by the intensity of the reference microwave noise signal from reference noise source 108. In this manner, the difference between the first and second level values of the electrical signal from synchronous detector 206 (which is what is actually measured by temperature meter 110) is an indication of the temperature of specimen 100. Besides this need for calibration, the type of relatively precise electric meter required for temperature meter 110 is relatively expensive.

A third improvement in apparatus employing a microwave radiometer to measure the temperature of a speciment with which the present invention is concerned (shown in FIG. 5) directly measures the temperature of an adjustably heated resistance with a relatively inexpensive thermocouple meter. The heated resistance generates microwave noise having an intensity in accordance with its temperature, and, therefore, operates as a reference microwave noise source. By adjusting the heating of the resistance to that temperature at which the microwave noise generated by the resistance matches the microwave noise received by microwave antenna means 104 from specimen 100, the temperature of resistance measured by the thermocouple meter corresponds to and is indicative of the temperature of specimen 100.

Figure 5:
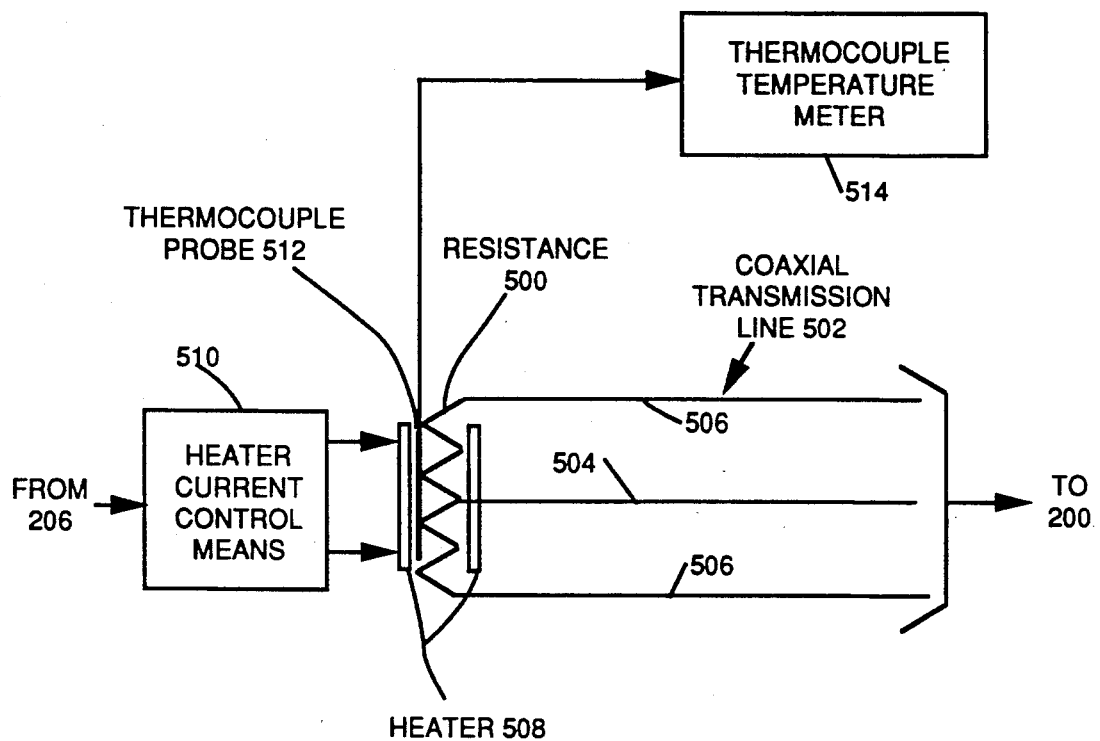
FIG. 5 illustrates a species of a reference noise source, constituting a third improvement in apparatus employing a microwave radiometer, that makes it possible to provide a microwave radiometer for measuring the temperature of a specimen that is simpler and less expensive than the prior-art species of microwave radiometers shown in FIGS. 2a and 2b.

Referring now to FIG. 5, resistance 500 terminates the left end of coaxial transmission line 502, preferably in its characteristic impedance. Coaxial transmission line 502 (which comprises inner conductor 504 surrounded by outer conductor 506) is terminated at its right end by the reference noise source input of Dicke switch 200. Surrounding resistance 500 is heater 508. Heater 508, which may comprise a coil of heating wire, is energized by heater current control means 510. The output from synchronous detector 206, applied as a control input to heater current control means 510, is used to adjust the amount of heater current that is then applied to heater 508. Specifically, the amount of heater current that is applied to heater 508 is adjusted to be substantially proportional to the difference in levels between the aforesaid first value (corresponding to the temperature of specimen 100) and the aforesaid second value (corresponding, in the case of FIG. 5, to the temperature of resistance 500).

By way of example, one implementation of heater current control means 510 comprises charging a capacitance through a diode with the control input applied thereto from synchronous detector 206, and then applying the voltage charge across this capacitance as an input to an operational amplifier. The output of the operational amplifier may then be used to control a current driver amplifier that provides the heater current to heater 508.

Assume that the temperature of specimen 100 is relatively high and that the temperature of resistance 500 is initially relatively low. In this case, the microwave intensity applied to Dicke switch 200 from microwave antenna means 104 is large relative to the microwave intensity applied through coaxial transmission line 502 to Dicke switch 200 from resistance 500. Consequently, the difference in levels between the aforesaid first and second values of the control input from synchronous detector 206 is large, resulting in the amount of heater current to heater 508 also being large. This increases the temperature of resistance 500, thereby decreasing the difference in levels and, therefore, the amount of heater current to heater 508. When the temperature of resistance 500 matches that of speciment 100, the amount of heater current to heater 508 is reduced to zero. This matching temperature is maintained, since any cooling of resistance 500 immediately causes heater current to heater 508 to resume. Thus, the steady-state temperature of resistance 500 corresponds to and matches the temperature of speciment 100.

As shown in FIG. 5, this steady-state temperature, sensed by thermocouple probe 512 situated in close thermal contact with resistance 500, is indicated by thermocouple temperature meter 514. Since the steady-state temperature and specimen 100 temperature match, the temperature indicated by thermocouple temperature meter 514 is a measure of the temperature of specimen 100.

The noise power generated by resistance 500 is insufficient by itself to also be used for impedance-matching purposes in the manner disclosed above in connection with the prior-art species of FIG. 2b. However, if the noise power generated by resistance 500 is amplified, the amplified noise power may be used for such impedance-matching purposes. Alternatively, a separate additional resistance which is also surrounded by heater 508 and heated thereby to the steady-state temperature may be used to generate the noise power for such impedance-matching purposes.

What is claimed is:

1. In apparatus employing a microwave radiometer to measure the temperature of a specimen; said apparatus including microwave antenna means which when situated in cooperative relationship with said speciment is responsive to a portion of the microwave interval of the frequency-spectrum distribution of the electromagnetic radiation emitted by said specimen; the improvement wherein said specimen is a given material at high temperature and wherein said microwave antenna means comprises:

an antenna sheath; and a microwave antenna adapted to be disposed within the interior of said antenna sheath, whereby at least a portion of said antenna sheath may be immersed in said given material at high temperature;

said antenna sheath being composed of a high-loss, high-temperature material that is substantially inert to said given material at high temperature so that it can withstand being immersed in said given material at high temperature continuously without substantial damage thereto, and said high loss, high temperature material of which said antenna sheath is composed exhibiting characteristics approaching that of a "black body" for absorbing heat radiation from the surrounding material at high temperature and then reradiating a portion of the absorbed heat radiation as microwave energy into said interior thereof; and said microwave antenna being composed of a low-loss, high-temperature dielectric material that is substantially inert to the high temperature reradiated into the interior of said antenna sheath and received by said microwave antenna.

2. The apparatus defined in claim 1, wherein:

said antenna sheath is in the form of a tube having an opening only at one end thereof; and said microwave antenna is adapted to be disposed within the interior of said antenna sheath and extend from said opening at one end thereof, whereby said portion of said antenna sheath may be immersed in said given material at high temperature with said opening at one end thereof situated outside of said given material at high temperature.

3. The apparatus defined in claim 1, wherein:

said high-loss, high-temperature material of which said antenna sheath is composed is a ceramic material.

4. The apparatus defined in claim 3, wherein:

said ceramic material of which said antenna sheath is composed comprises a mixture of alumina and graphite.

5. The apparatus defined in claim 1, wherein:

said low-loss, high-temperature dielectric material of which said microwave antenna is composed is a ceramic material.

6. The apparatus defined in claim 5, wherein:

said ceramic material of which said microwave antenna is composed comprises low-loss alumina.

7. The apparatus defined in claim 1 wherein:

said given material at high temperature is molten steel.

8. In apparatus employing a microwave radiometer to measure the temperature of a specimen; said radiometer including microwave switch means at least responsive in a first state of said microwave switch means to a first microwave signal having an intensity corresponding to the temperature of said specimen and in a second state of said microwave switch means to a second microwave signal having an intensity corresponding to a reference noise signal; the improvement wherein said microwave switch means comprises:

a first hybrid circuit including a first input to which said first microwave signal is applied, a second input to which said second microwave signal is applied, a first output from which a first combination of said first and second microwave signals is derived, and a second output from which a second combination of said first and second microwave signals is derived;

a second hybrid circuit including first and second inputs and at least one output;

first means including first amplifier means and a switchable microwave phase shifter for amplifying and forwarding said first combination of first and second microwave signals from said first output of said first hybrid circuit to said first input of said second hybrid circuit, said switchable microwave phase shifter inserting a 0° phase shift in said amplified and forwarded first combination of said first and second microwave signals in a first switch state thereof and inserting a 180° phase shift in said amplified and forwarded first combination of said first and second microwave signals in a second switch state thereof;

second means including second amplifier means for amplifying and forwarding said second combination of first and second microwave signals from said second output of said first hybrid circuit to said second input of said second hybrid circuit;

whereby solely a given amplified one of said first and second microwave signals is derived at said one output of said second hybrid circuit in response to said switchable microwave phase shifter being in its first switch state, and solely the other amplified one of said first and second microwave signals is derived at said one output of said second hybrid circuit in response to said switchable microwave phase shifter being in its second switch state.

9. The apparatus defined in claim 8, wherein:

said first hybrid circuit comprises a first hybrid ring including a first input port constituting said first input of said first hybrid circuit, a second input port constituting said second input of said first hybrid circuit, a first output port constituting said first output of said first hybrid circuit, and a second output port constituting said second output of said first hybrid circuit; and said second hybrid circuit comprises a second hybrid ring including first and second input ports constituting respectively said first and second inputs of said second hybrid circuit, and at least one output port constituting said one output of said second hybrid circuit.

10. The apparatus defined in claim 8, wherein:
said switchable microwave phase shifter is responsive to a control signal applied thereto for switching it back-and-forth between its first and second switch states.

11. The apparatus defined in claim 8, wherein:
said second hybrid circuit includes first and second outputs;
whereby solely said given amplified one of said first and second microwave signals is derived at said first output of said second hybrid circuit in response to said switchable microwave phase shifter being in its first switch state, solely the other amplified one of said first and second microwave signals is derived at said first output of said second hybrid circuit in response to said switchable microwave phase shifter being in its second switch state, solely the other amplified one of said first and second microwave signals is derived at said second output of said second hybrid circuit in response to said switchable microwave phase shifter being in its first switch state, and solely said given amplified one of said first and second microwave signals is derived at said second output of said second hybrid circuit in response to said switchable microwave phase shifter being in its second switch state.

12. The apparatus defined in claim 11, wherein:
said switchable microwave phase shifter is responsive to a control signal applied thereto for switching it back-and-forth between its first and second switch states.

13. The apparatus defined in claim 11, wherein:
said radiometer includes means for applying said control signal to said switchable microwave phase shifter, a first broadband receiver for receiving the output from said first output of said second hybrid circuit as an input thereto, a second broadband receiver for receiving the output from said second output of said second hybrid circuit as an input thereto, a first rectifier for rectifying the said first broadband receiver, a second rectifier for rectifying the output of said second broadband receiver, and means for deriving the difference in signal level between the respective outputs of said first and second rectifiers.

14. The apparatus defined in claim 9, wherein:
said first combination of first and second microwave signals from said first output of said first hybrid circuit is applied to an input of said first amplifier means, an output of said first amplifier means is applied to an input of said switchable microwave phase shifter, and an output of said switchable microwave phase shifter is forwarded to said first input of said second hybrid circuit.

* * * * *